US007418481B2

(12) United States Patent　　(10) Patent No.: US 7,418,481 B2
Fredriksson　　(45) Date of Patent: Aug. 26, 2008

(54) ARRANGEMENT FOR DISTRIBUTED CONTROL SYSTEM

(75) Inventor: Lars-Berno Fredriksson, Kinna (SE)

(73) Assignee: Timegalactic AB

( * ) Notice: Subject to any disclaimer, the term of this patent is extended or adjusted under 35 U.S.C. 154(b) by 281 days.

(21) Appl. No.: 10/523,632

(22) PCT Filed: Jul. 16, 2003

(86) PCT No.: PCT/SE03/01219

§ 371 (c)(1),
(2), (4) Date: Feb. 4, 2005

(87) PCT Pub. No.: WO2004/015945

PCT Pub. Date: Feb. 19, 2004

(65) Prior Publication Data

US 2006/0077998 A1　Apr. 13, 2006

(30) Foreign Application Priority Data

Aug. 7, 2002　(SE) ..................................... 0202372

(51) Int. Cl.
*G06F 13/00* (2006.01)
(52) U.S. Cl. .................. 709/217; 709/236; 709/250
(58) Field of Classification Search ................ 709/217, 709/219, 236, 249, 250
See application file for complete search history.

(56) References Cited

U.S. PATENT DOCUMENTS 6,128,315 A　10/2000　Takeuchi (Continued)

FOREIGN PATENT DOCUMENTS

EP　0890906　1/1999

(Continued)

OTHER PUBLICATIONS

Fredriksson, "Bluetooth TM in Automotive Diagnostics", Sweden, 010502, 7 pages.

(Continued)

*Primary Examiner*—Viet Vu
(74) *Attorney, Agent, or Firm*—Connolly Bove Lodge & Hutz LLP; Myron Keith Wyche

(57) ABSTRACT

In an arrangement, functions and/or structures in a distributed control system (24) that works with a first protocol (28) are analysed and/or monitored. A first unit (23) is connected or can be connected to the control system, which first unit, due to its compatibility with the first protocol, receives and/or sends task instructions concerning the functions and/or structures. The first unit comprises or is connected to a second (22) and transforms at least those parts in the first protocol that relate to the task instructions concerning the functions and/or structures into a second protocol, by means of which the said tasks can be initiated and/or carried out in a tool arrangement (1) that is comprised in or can be connected to the second unit. This tool arrangement works with the second protocol, whereby primary readings and/or modifications in the first protocol on the basis of the analysis and/or monitoring can be carried out by means of secondary readings and/or modifications in the second protocol. The analysis and monitoring are simplified and tools and protocol-handling can be separated. In addition, time functions in the system(s) can be made unambiguous.

13 Claims, 5 Drawing Sheets

U.S. PATENT DOCUMENTS

| | | | | |
|---|---|---|---|---|
| 6,728,603 | B2* | 4/2004 | Pruzan et al. | 701/1 |
| 7,046,638 | B1* | 5/2006 | Klausner et al. | 370/313 |
| 7,171,372 | B2* | 1/2007 | Daniel et al. | 705/7 |
| 2002/0032028 | A1 | 3/2002 | Kaupe | |
| 2002/0110146 | A1 | 8/2002 | Thayer et al. | |
| 2002/0158775 | A1* | 10/2002 | Wallace | 340/870.07 |
| 2002/0161493 | A1* | 10/2002 | Bird et al. | 701/29 |
| 2005/0193036 | A1* | 9/2005 | Phillips et al. | 707/202 |

FOREIGN PATENT DOCUMENTS

| | | |
|---|---|---|
| EP | 1197396 | 4/2002 |
| WO | WO-96/27171 | 9/1996 |
| WO | WO-98/33129 | 7/1998 |
| WO | WO-01/49532 | 7/2001 |

OTHER PUBLICATIONS

International Search Report Appl. No. PCT/SE03/01219, dated Sep. 30, 2003, 3 pages.

* cited by examiner

ARRANGEMENT FOR DISTRIBUTED CONTROL SYSTEM

BACKGROUND OF THE INVENTION

The present invention relates to an arrangement for analysing and/or monitoring functions and/or structures in a distributed control system that works with a first protocol.

The analysis and monitoring of functions in distributed systems are already known, for example control systems for machinery, vehicles, for example cars, processes, etc, of the type described in the patent applications and patents submitted and obtained by the same applicant and/or inventor as in the present patent application. Reference is made, among other things, to SE 466 726 and SE 0101987-6.

Reference is also made to the fact that many machines, cars, etc, are constructed with subsystems that work with protocols that are basically distinct, but that work together through gateways or protocol converters. Thus, for example, in cars more sophisticated components can be arranged to work with protocols based on CAN (Controller Area Network), while simpler parts of subsystems work with, for example, LIN.

There is a need to be able to analyse, simulate and monitor the subsystems in question using the same analysis tool and for this purpose it has been proposed that a special hardware module should be used, connected to the basic unit or tool via an interface. In addition to the necessity of an additional interface, in this case a special version of the application is required.

There is also a need for an arrangement in which the tool, simulation and protocol functions can be allocated to different specialists in the respective fields, with the result that the development of tools and protocols can be kept separate and that the tool developer does not need to have a thorough knowledge of the version of the protocol or that the protocol developer does not need to have a thorough knowledge of the tool functions.

There is also a need, in connection with different subsystems of this kind, to have arrangements for reliable and accurate indication of the time, on which functions in the subsystem are to be based.

There is also a need to be able to allocate computation-intensive and memory-intensive calculation and analysis tasks to different incorporated components in an optimal way (cf. use of PC, PDA, etc). It is also advantageous in certain connections to be able to utilize unit(s) in or with different functions in different functional phases.

SUMMARY OF THE INVENTION

An object of the present invention is, among other things, to solve this problem and propose an arrangement that considerably simplifies the analysis and monitoring work and achieves an appropriate allocation of the tool, simulation and protocol functions.

The principle characteristics of the new arrangement are, among other things, the fact that a first unit is connected or can be connected to the control system, which first unit, due to its compatibility with the first protocol, can receive and/or send task instructions concerning the functions and/or structures, and the fact that the said first unit comprises or is connected to a second unit and transforms at least those parts in the first protocol that relate to the task instructions concerning the functions and/or structures into a second protocol, by means of which the said tasks can be initiated and/or carried out in a tool arrangement that is comprised in or can be connected to the second unit, which tool arrangement is arranged to work with the second protocol. In this way, primary readings and/or modifications in the first protocol on the basis of the analysis and/or monitoring can be carried out by means of secondary readings and/or modifications in the second protocol. The more concrete characteristics of the invention are apparent from the characterizing part of claim 1.

Further developments of the invention are apparent from the following subsidiary claims.

The problems described by way of introduction are solved by means of what is proposed in the above.

The tool arrangement or basic unit can work with information stacks in several layers and can be designed to make possible analysis and/or monitoring of one or more distributed control systems. In general, a complete tool/analysis arrangement stack can logically be divided into the following functions:
1. Graphical presentation function [TN1]
2. Input data/output data function
3. Analysis/Simulation/Processing function
4. Database function
5. Protocol function
6. Network connection function.

For very simple protocols, all the functions can be carried out within a PC, but usually the functions 5 and 6 are allocated to one or two units that are specially developed for the network protocol that is used in the network that is to be analysed. The communication between the PC and the special protocol unit takes place using any protocol and connection standardized for general exchange of data between the PC and its peripherals, for example PCMCIA, V24, USB, etc. This communication only transfers data and the characteristics of the protocol are not used as basis for the analysis/processing work or for characteristics of the database. In order to solve the previously mentioned problems, the architecture is enhanced as follows for a first network protocol (which can be generic or special): [TN2] to which the following are connected, adapted for a second protocol:
1. Gateway function
2. Analysis/Processing function
3. Database translation function
4. Protocol function
5. Network connection function Thus two or more units connected in series can be connected between the tool and the control system, where one of the units is connected directly or via additional unit(s) to the control system. The tool arrangement can be arranged to handle tasks in an upper layer in the stack, while the said second unit is arranged to handle tasks in a layer below the upper layer in the stack. The other unit can be arranged to handle tasks in a layer below the latter layer in the stack. [TN3] The tool arrangement can be arranged to work with a protocol allocated to it, in such a way that task instructions regarding differences between the functions related to the tasks in the stack of the unit connected to the control system and the control system's actual functions can be transferred to the tool arrangement to instigate readings or to modify the tasks by means of the allocated protocol. A gateway function or protocol converter can transform task instructions in a protocol utilized by the control system into task instructions in the allocated protocol, or vice versa.

[TN4]

BRIEF DESCRIPTION OF THE DRAWINGS

A currently preferred embodiment that has the significant characteristics of the invention will be described below, with reference to the attached drawings, in which.

DETAILED DESCRIPTION

Figure 1:
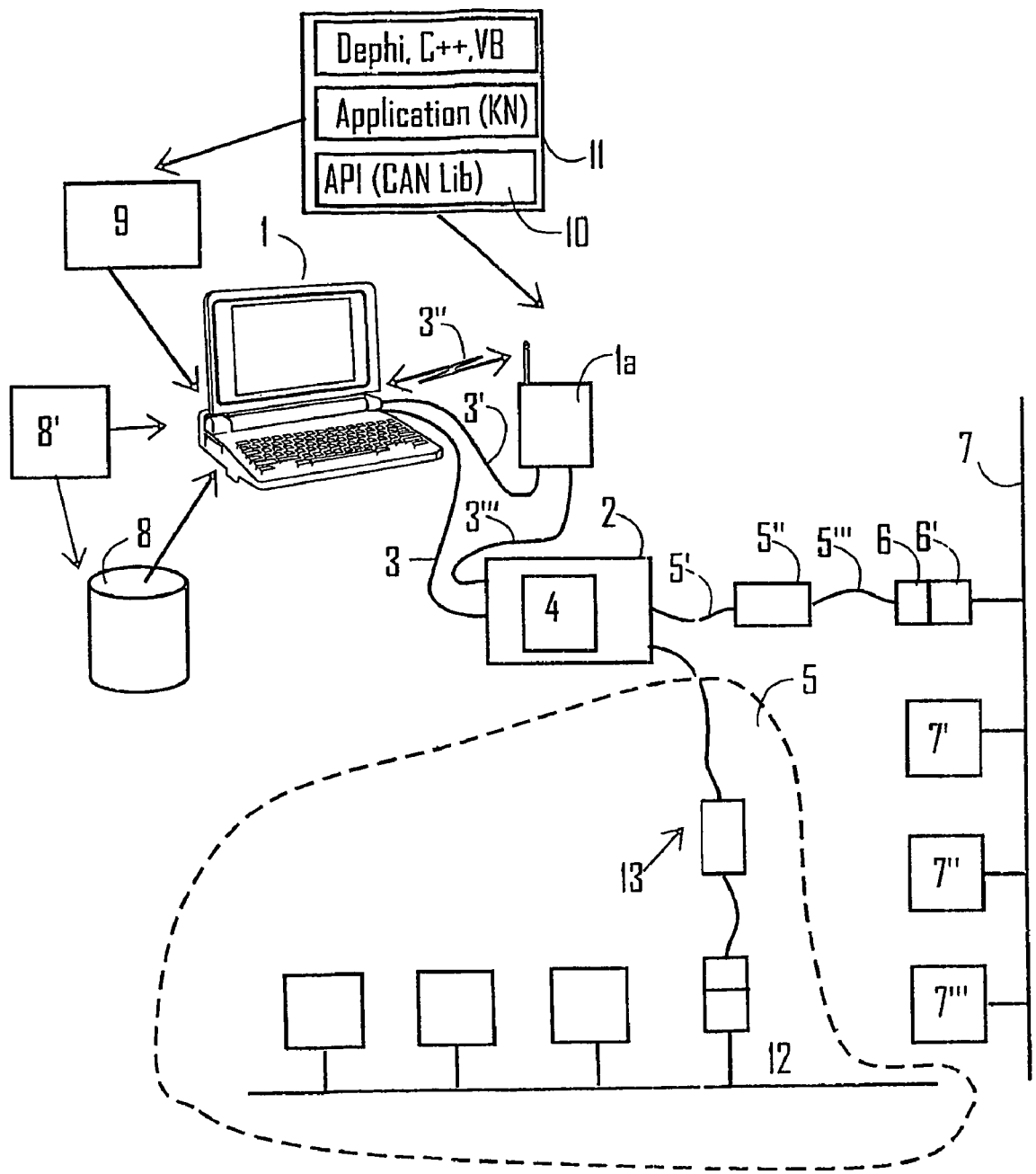
FIG. 1 shows in block diagram form and in outline, the connection of the tool and the units to a control system comprising two control subsystems and with reference to current technology.

The tool or the tool arrangement consists of a number of modules or units that are shown schematically in FIG. 1, where unit 1, the basic unit, comprises a unit suitable for human communication and communication with peripherals, for example, a PC or PDA of conventional type. In one embodiment, a unit 2, which comprises a PC-interface, is connected to the unit 1. The connection is carried out via a connection 3 that can be of a current type for connecting the peripheral unit to a PC, for example USB, Firewire, PCM-CIA, PCI, Bluetooth, etc. The unit 2 comprises a microprocessor with requisite peripherals, symbolized by 4, and a bus that comprises a first cable component 5', a bus adapter unit 5" and a second cable component 5''' that is connected to a contact 6 by means of which it is connected to the system bus 7 via the contact 6' connected to the bus. System modules connected to the system are symbolized by 7", 7' and 7'''. The basic unit 1 comprises an appropriate database 8, an application 9 that works together with this and an application interface (API) 10 working with the unit 2. By means of database edition 8', [TN5] the user can edit the database and indicate how the values in this are to be interpreted and represented on the screen in the tool. Input of configuration data can be carried out directly from the PC's keyboard or from a configuration file. As an example of a database editor can be mentioned "Navigator Database Editor" from Kvaser AB, SE. The application is written in a commonly used language, for example Delphi, C++ or Visual Basic. Examples of an application are Kvaser Navigator and API CANlib from Kvaser AB. The construction is shown schematically by 11. An example of the unit 2 is LAPcan II and a unit 13 consists of DRVcan 251, these also being produced by Kvaser AB. With the described configuration and exemplified products, the system 7 can be analysed and can work with the protocol CAN and a physical interface according to the specification for Philips CANdriver 82C251. An additional unit corresponding to the unit 13 can be connected to the unit 2 with the designation LAPcan II for simultaneous analysis of an additional system 12 with a different physical interface, for example according to Philips 1053. This is shown by 12. The unit 13 is here adapted to this bus and can consist of DRVcan 1053 from Kvaser AB. The unit 13 contains a memory with information concerning the physical interface. By reading off the memory content during a start-up phase, the application can adapt itself to the relevant interface. This is described in detail in the Swedish patent SE 466 726. Additional systems can be analysed at the same time by connecting to the basic unit additional units corresponding to the units 2 and 13. It is common to all the systems in this case that all work with protocols based on CAN. A modern PC has sufficient computing power and memory space to hold a sophisticated database and to carry out computationally-intensive calculation and analysis tasks. A PDA is more limited in this respect, for which reason it can be appropriate to allocate more computationally- and memory-intensive tasks to the unit two and/or to reduce the capacity of the tool in a PDA version. This can, for example, be carried out by using the PC version as a "programming tool" for the PDA version. Special analysis configurations and part of the database necessary for these, and a fixed presentation configuration of the analysis result on the PDA's screen. [TN6] After it has been determined in the PC which tasks are to be carried out and how the result is to be presented, a configuration file is generated which is then downloaded to the PDA. The configuration can be carried out in stages, for example with a separate configuration of the presentation-function, another for the database function, etc.

Many machines, cars, etc, are constructed with subsystems that work with protocols that are basically distinct but that work together through gateways. Examples of this can be found in cars, where certain more sophisticated components work with protocols based on CAN, while simpler subsystems work with the protocol LIN. The CAN components can be analysed with CANtool, for example Kvaser Navigator, and LIN systems with LINtool, for example LINspector from Volcano Automotive. As CAN systems and LIN systems often work together via a gateway, there is a need to analyse these in the same analysis tool. Vector-Informatik AB has solved the problem for its tool "CANalyzer" with a special hardware module "LINda", directly connected to the basic unit via a V24-interface. In addition to an additional interface for the basic unit, this solution requires a special version of application.

Figure 2:
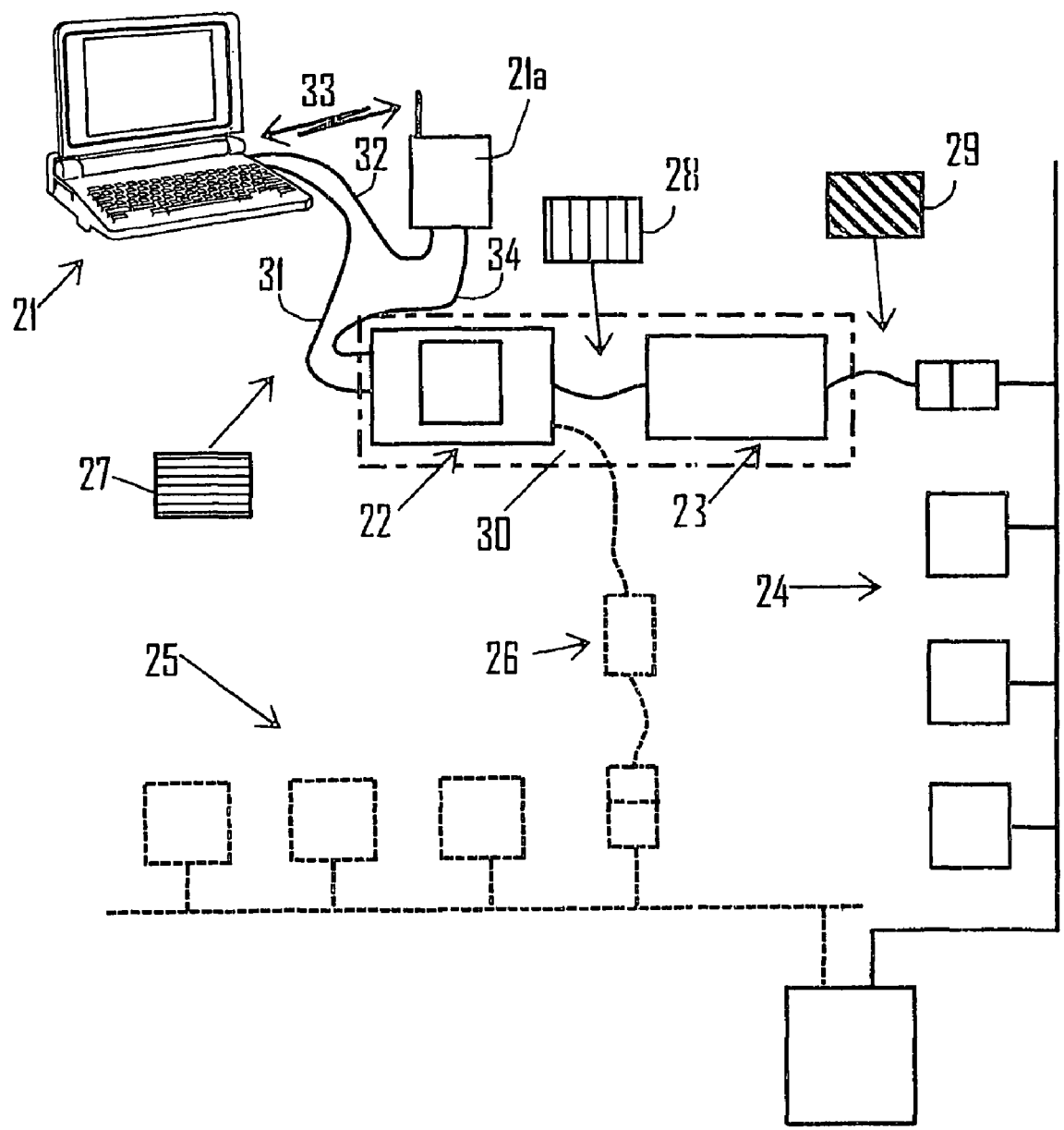
FIG. 2 shows in block diagram form and in outline, parts of FIG. 1 supplemented by parts specific to the invention.

The tools known to date have limitations dependent upon their architecture. For analysis of the communication in systems of the type described, it is essential to be able to relate in time events that have occurred in the different subsystems. In the solution according to the invention, as shown in FIG. 2, this can be carried out simply between two systems 24, 25 as the two systems are connected to the same unit 22 (cf. the unit 2) and the events can accordingly be timed using the same clock. It has already been mentioned that more than two systems can be analysed by connecting additional units 22 to the unit 21 (cf. unit 1). However, this has the disadvantage that the events are related to the clock of the respective connected unit 22. Accuracy will be poor for comparisons of events that take place in subsystems that are connected to different units 22. A first step that is made possible by means of the invention is to solve the problem for two subsystems 24, 25 working with different protocols. By connecting one subsystem 24 that works with a protocol allocated to it to a tool 21 developed to fulfill the analysis requirements imposed by this subsystem and connecting the second subsystem 25 that works with a protocol allocated to it to the tool's unit 22 via a unit 23 with suitable characteristics, several advantages are obtained in comparison to the known solution. Suitable characteristics for the unit 23 are that it is to be able to act as a gateway or protocol converter between the two protocols, that it can be connected directly to a second network 25 or via a unit 26 and also that it can carry out analysis tasks on the unit's 22 protocol. In this way, an existing tool for a protocol can easily be enhanced in order to analyse a new protocol. The development of the new enhancement is limited to a new unit 23 and a message/command protocol for translation of messages occurring in the protocol for the unit 22 into a suitable form for use in databases and interpreters for the tool's protocol. For a user, it is a great advantage that he can use his existing tool, and for the tool producer, it is a great advantage that the basic development can be carried out in a completely separate environment without affecting other parts in the tool.

The tool according to FIG. 2 thus consists of a basic unit 21 and a unit 22 according to the previous description. A unit 23 is connected to the unit 22, which unit 23 is in turn connected to a system (control subsystem) 24. The unit 22 can be connected to a second system (control subsystem) 25 via a unit 26 as previously described (cf. also 13). The communication between the unit 21 and the unit 22 is carried out by means of a protocol symbolized by 27, between the unit 22 and the unit 23 by means of a second protocol symbolized by 28, and between the unit 23 and the analysed system by means of a third protocol symbolized by 29. By the term protocol is meant here a basic-protocol supplemented by higher layers. These layers differ from the layers of the current OSI-model. Many tasks that according to the OSI-model are handled by the lowest layers can be handled by higher layers. For example, the protocol 27 can be based on a suitable variant of USB supplemented by API-functions that are tailor-made for a particular unit 22. The protocol 28 can be based on the same protocol with additions specially developed for the unit 23, or alternatively based on a different basic protocol, for example CAN, adapted for the unit 23. These adaptations can be completely specified or can be able to be customized with a modifying protocol. As a comparison, J1939 can be mentioned as an example of a completely specified protocol based on the basic protocol CAN and CanKingdom can be mentioned as an example of a protocol that can be customized, this also being based on CAN, with which a completely specified protocol can be defined. Corresponding principles can be applied for the basic protocol 28, in order to obtain the said protocol. The protocol 29 is always the same protocol as the one used in the system 24 or 25. There can be additional protocols, specially adapted to be used in a configuration or start-up phase.

Figure 3:
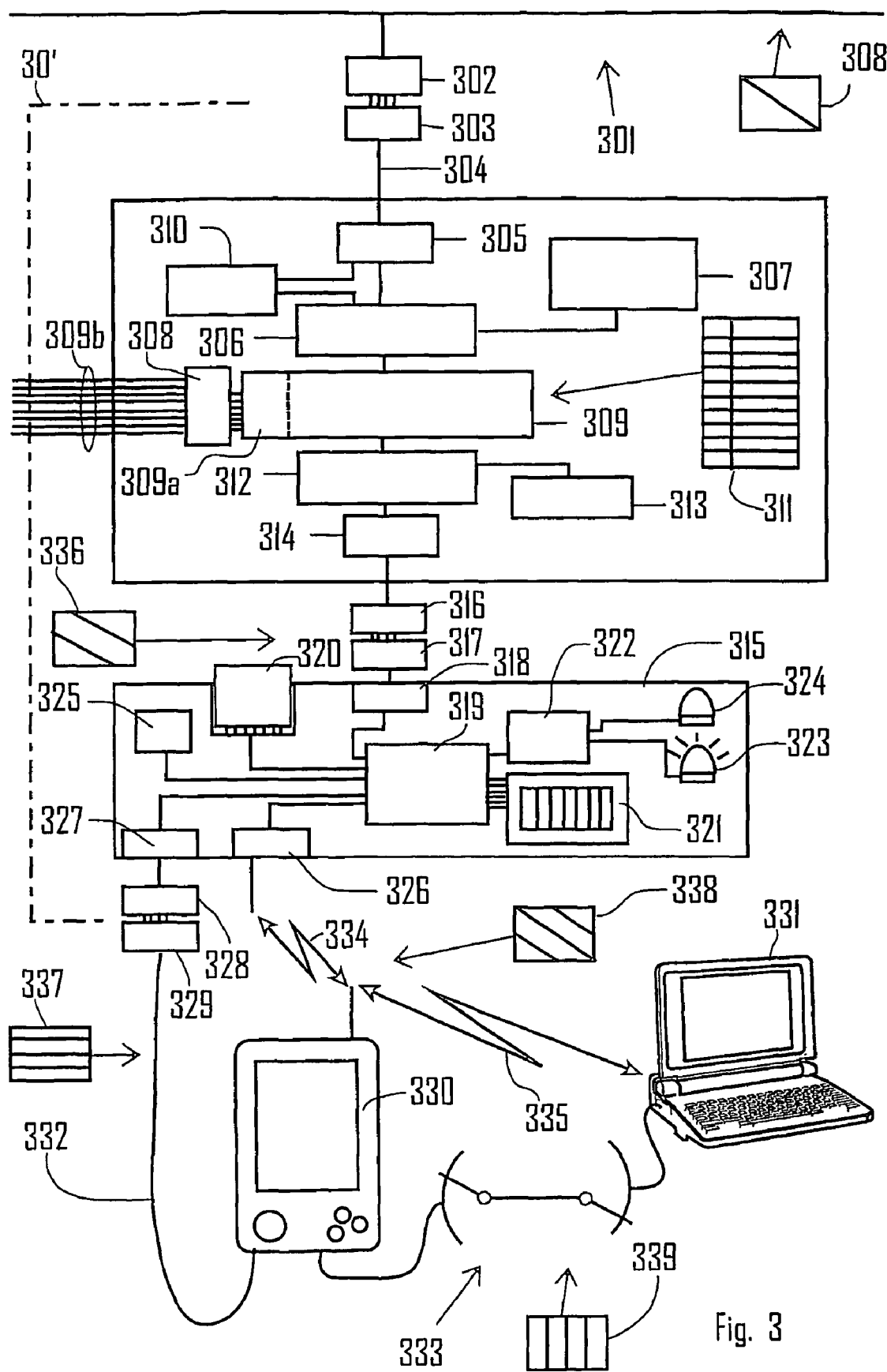
FIG. 3 shows in block diagram form, a unit incorporated in the block diagram.

FIG. 3 shows schematically the construction of a unit 23 according to FIG. 2. For the sake of clarity, it is provided with two microprocessors, but the task can be solved with one microprocessor. The unit 23 [is] connected on one side to a system 301 via the contacts 302, 303 and the connection lead 304. [TN7] The signals on the bus can be read by the microprocessor 306 via the interface electronics 305. Using instructions stored in the memory 307, the signals can be interpreted in accordance with the protocol 308 used in the system. In its simplest form, the interpretation can involve only the received bit pattern being transferred, but the interpretation can be of an extensive nature where much supplementary information provided according to the rules of the protocol is added by the microprocessor. The information thus interpreted is transferred to the dual-ported memory 309. Additional information of interest can be added to the interpreted information, for example time-stamping indicating when the information was obtained from the system. The time is obtained from the clock 310 that is triggered in a suitable way by the interface electronics, for example when the reception of a message commences. The information is stored in the dual-ported memory in an organized way according to rules adapted according to the requirements of the system protocol, so that specific information is stored in a specific location indicated by the table 311. The dual-ported memory 309 can be read by the microprocessor 312 which can communicate according to a second protocol using rules stored in the memory 313 and physically via the interface electronics 314 with the second unit 315. In the memory 313 are also stored rules for how the information stored in 309 according to the rules in 307 and 311 is converted according to the rules for the second protocol. The clock 310 can be symbolized [TN8] with the clock in the second unit 315 via the protocol or by a separate clock synchronization connection. For examples of synchronization via protocols, refer to CanKingdom. In this way, all third units connected to a second unit can be time-synchronized. An alternative solution is that the third units are connected together with a synchronization cable. The unit 23 can also simulate a module completely or partially using appropriate software.

Figure 4:
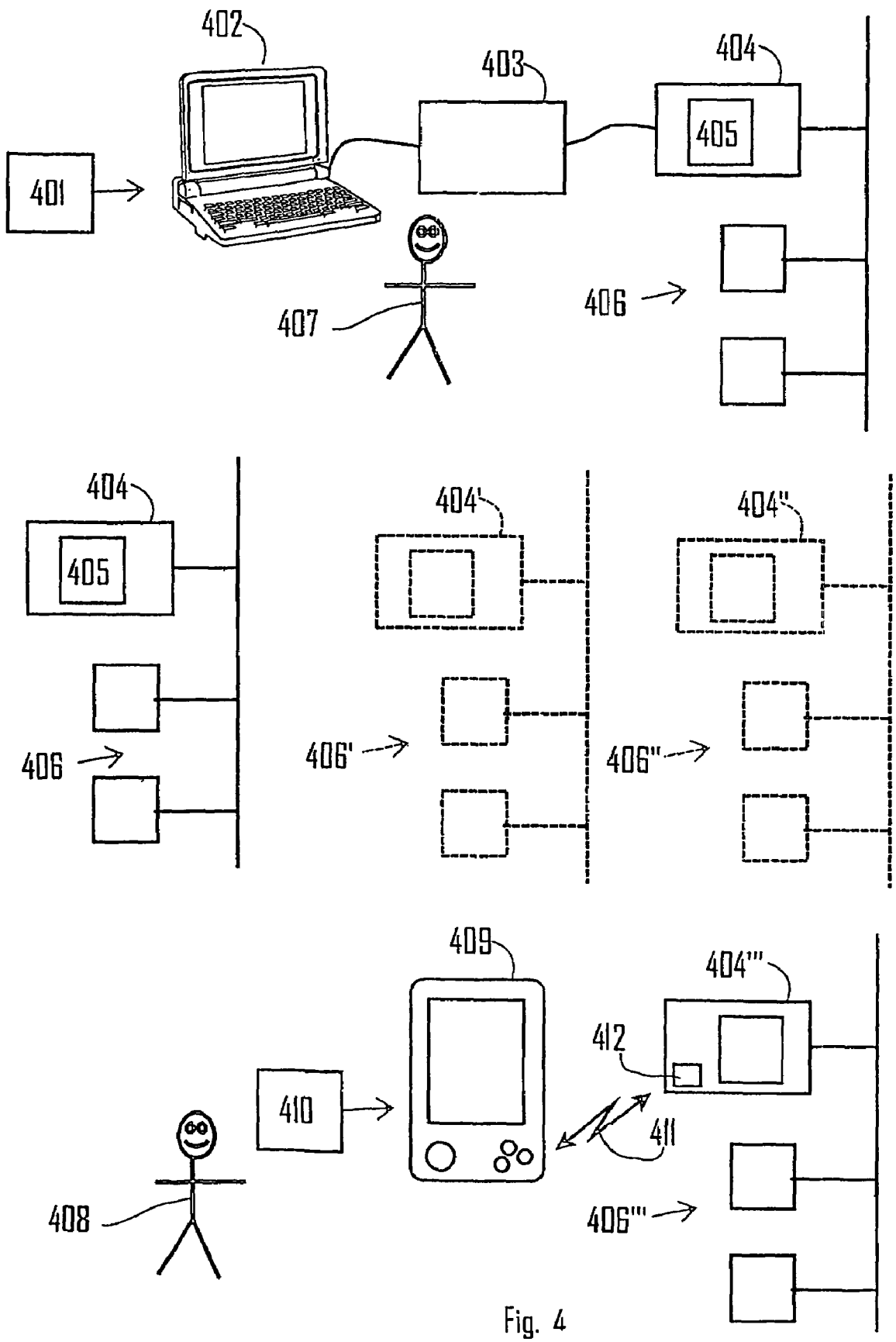
FIGS. 4 and 5 show in block diagram form, further embodiments in relation to the embodiments according to FIGS. 1-3.

FIG. 4 shows a variant of the utilization of the invention. In a first stage, the tool 401, which is implemented on a PC 402, which is connected to a second unit 403 and a third unit 404, is equipped with an enlarged permanent memory and/or with a temporary memory 405 that can be fitted. The tool arrangement is connected to a system 406 and connected for direct analysis of the system, carried out by a human user 407. The user acquires experience of what it is important to check and verify in the system in order to ensure a reliable functioning. When the experience has been acquired, rules are generated for how the analysis can be repeated automatically, for example which messages need to be checked, sequences of messages on both sides of a given message with given content that must be saved for further analysis, which messages are to be saved upon the appearance of error messages, active transmission of messages in given situations, etc. These rules are saved in the form of a data file that can be downloaded to the third unit 404. In addition, the user draws up rules for a subsidiary database adapted for a PDA and rules for how collected information and the analysis result are to be presented in a PDA. These rules are compiled in one or more files that can be interpreted by a PDA with appropriate software. These files are also able to be downloaded to the third unit. In this first stage, the third unit 404 acts as interface between the system and other parts of the tool.

In a second stage, the generated files are downloaded to one or more third units. This can be carried out directly using serial communication or via a temporary memory. Using instructions from these files, the third unit can then independently collect and process information important for the analysis and save it in the enlarged memory. Thus, in a simple way a large number of third units can be connected to an equally large number of systems, for example a fleet of vehicles. The third units function in this second stage as sophisticated data loggers.

In a third stage, a technician 408 with a PDA 409 can connect this to a third unit 404''' which worked for a time in the system 406'''. The PDA's software 410 starts by uploading via a Bluetooth connection 411 the files that are stored in the third unit equipped with Bluetooth interface 412 with information about how the analysis is to be presented in the PDA, how the database is to be organized and how the further analysis is to be carried out. In this way, a large number of technicians can analyse a large number of systems in an organized way. In this third stage, the third units function together with the respective PDAs as a tailor-made analysis tool.

Figure 5:
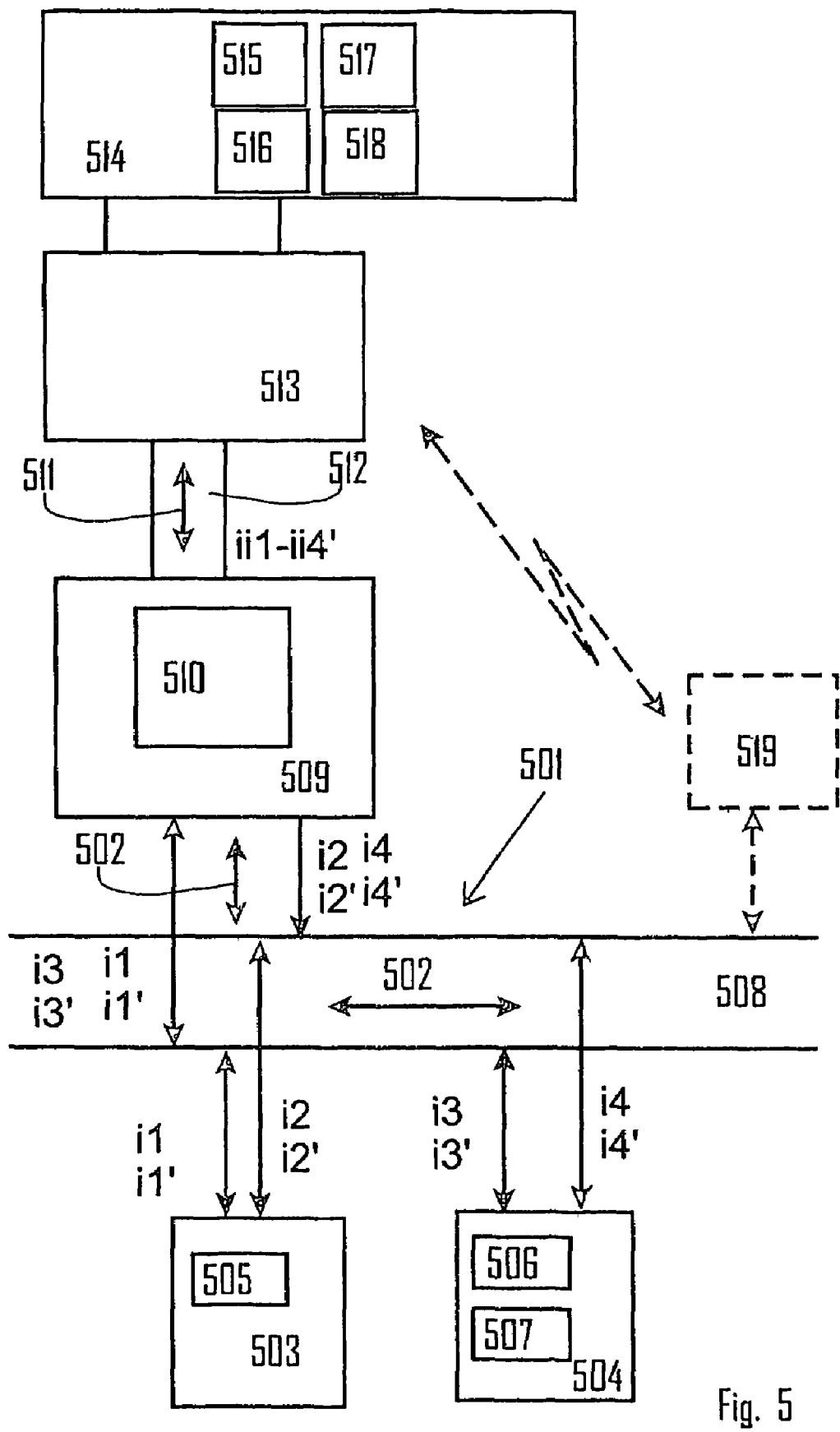

A further embodiment is shown in FIG. 5. A distributed control system or data collection system 501 works with a first protocol 502 and comprises a number of modules 503 and 504 for different tasks. For example, the module 503 is arranged to carry out temperature measurement using the sensor 505, while the module 504 can carry out several tasks 506, 507, which can be selected by means of commands. The commands i1, i3 and command responses i1', i3', and signals i2, i4 and signal responses i2', i4' are exchanged utilizing the first protocol via the link 508. A first unit 509, arranged for communication with the system and at least certain analysis of the same utilizing the first protocol, is connected to the link and can exchange signals and commands i1, i1', i2, i2', i3, i3', with a first structure and function adapted in accordance with the requirements of the system and the first protocol. The first unit comprises a conversion unit 510 which can convert signals and commands from the first structure and function in accordance with the first protocol and the requirements of the system to a second structure and function adapted to a system, real or virtual, working with a second protocol 511 with similar requirements. The converted signals and commands, in whole or in part, marked in the Figure by ii1-ii4', are transferred via the link 512 to a second unit 513 arranged to work with the second protocol and to forward these in more or less processed form to the tool 514. The tool 514 is arranged to work with the second protocol and the system with functions such as scanning of messages 515, control functions 516, analysis functions 517 and structure functions 518. The flow described can take place in the reverse direction from the tool to the first system, with signals and commands generated for the second system and protocol being sent via the second unit to the first unit where signals and commands are converted to structure and function in accordance with the requirements for the first system and the first protocol. It is also within the concept of the invention to utilize a second module 519 in the system as gateway for the communication between the first unit and the tool. In vehicles, such a module can suitably be a module capable of telephone communication between the vehicle and the public telephone network or a module for statutory diagnosis information, so-called "OnBoard Diagnostics" (OBD), and the second protocol can then suitably be a standardized diagnosis protocol, for example a variant of KWP 2000 for CAN (ISO 15765). The unit (PDA or the like) or second part that can be connected to the computer or the first part (PC) is capable of carrying out part of the tasks that the PC can carry out. These tasks are configured in the PC and downloaded to the PDA in configuration files. The PDA or the like can consist of a standard unit that does not have a relevant interface, for example a CAN-interface. The PDA can be replaced by a simpler unit with indications, for example lamp, lights, signal device, etc, that indicates whether the system tested, simulated, etc, by the unit fulfills predetermined functions or specifications. The PDA or the unit has limited communication with the user and in this way simplified procedures can be utilized for testing or the like. If the PDA (Personal Digital Assistant) or the unit gives a signal that the test or the like cannot be carried out, it can be connected to the more powerful PC, which can download additional or other tasks instructions to the PDA, for example after it has carried out the analysis, simulation, etc, of the given information. The PDA or the like can also be disconnected from the PC with a special means of disconnection (not shown) after the download and can be utilized for other systems than those shown. Several PDAs can be loaded from the PC and allocated to various technicians in the field. The unit 2 according to FIG. 1 can alternatively consist of a PDA unit 1a with connections 3', 3" and 3'" to the tool component 1 (3'=permanent and 3"=wireless) and the unit 2 respectively, which in accordance with what is described below can then form a first unit, with the PDA unit being regarded as being incorporated in a tool arrangement with the unit 1. The third unit 13 belongs to the area 5 with connections to the subsystem 12. According to FIG. 2, the units 22, 23 can alternatively be incorporated in a unit 30 that is available on the market as a combined unit. The tool arrangement comprises a sophisticated part 21 and a less sophisticated part (PDA) 21a. The connections 31, 32, 33, 34 are arranged in a corresponding way to 3, 3', 3", and 3'". In the unit 30', the said unit (23') in FIG. 3 is able to be connected to the unit 315 (or vice versa). The connectors are shown by 316, 317. A communication circuit 318 is connected to a microprocessor 319 with incorporated peripherals, including memory/memories. A memory module 320 is arranged with logging equipment, recording and playback facilities, etc. A memory connected to the microprocessor is writable and readable from two (both) directions, that is from both the bus side and the system side. The memory can be divided into a number of subsidiary memories with different algorithms that are password-protected. The content can thus be encrypted. Verifications and signalling are protected by codes, passwords, etc. A random number generator, PGP (Pretty Good Privacy), can be incorporated in the function. [TN9] A connection device 322 is incorporated in a function for simple handling in the field. The equipment 315 indicates test results with a "Yes" and "No" function. Upon successful completion of the test, a device (lamp, bell, etc) 323 can be activated. If the equipment and the test function programmed therein receive a negative indication that the vehicle/car (the test object) does not fulfill the requirements laid down, the device 324 is activated. The devices 323, 324 can consist of a device that operates with different colors, signals, etc, see above. A random number generator is also connected to the microprocessor 319 which generates random numbers for code functions, etc. Communication circuits for Bluetooth and USB (for example) are indicated by 326, 327. Connectors 328, 329 make possible connection of basic tool components 330 (PDA) and sophisticated tool components 331, which components can also be connected to the circuit 326 in the case of Bluetooth. The connections 332, 333, 334, 335 can be cable-based or wireless connections. PDA 330 can thus be connected by wireless means to the circuit 326 (see 334) and the component 331 (see 335). A protocol for CAN, USB, etc, is indicated by 336. A protocol 337 can be based on USB and a protocol 338 is based on Bluetooth. A protocol 339 can be based on PCPIP (Word Wide Web). [TN10] See the above, regarding the said protocols. The user can specify that what is to be sent is to go under, for example, KVASER's ID, whereupon KVASER provides the relevant ID. The unit 23' contains a part 309 with a part 309a (1/0) that works with digital and/or analogue functions. The part 309a comprises inputs and/or outputs for 309b for the said functions. The equipment can be arranged to work with hard-coded serial numbers and ID. Memory areas that are writable and readable from the PC-side are available for this purpose. Customer numbers for systems and PCs can be used. Verifications and digital signatures are arranged to be carried out with hard-coded keys. The PDA unit can be replaced by a simpler unit with the said functions for approval and non-approval, that is the unit has communication to the user that is even more limited than that of the PDA. The powerful PC part can be consulted or can take over the test in the event of non-approval. In one embodiment, the PDA unit can solve only known problems. Interaction can take place by data and/or voice. Problems that are not resolved at the PDA-level are resolved at PC-level and entered in the database, whereby both the problem and its solution become known and can thereafter, for example, be included in those that are to be resolved using the PDA or unit in question. Signalling and verification can be carried out with asymmetric ciphers both between PC and PDA and between PDA and vehicles/cars (test objects). With PGP, one and the same symmetrical key is encrypted. In FIG. 5, 520 is a wireless connection between the units 513 and 519.

The invention is not limited to the embodiments described above by way of example, but can be modified within the framework of the following patent claims and the concept of the invention.

The invention claimed is:

1. An arrangement for at least one of analyzing, simulating and monitoring functions and/or structures in a distributed control system (24) that works with a first protocol (29), comprising:

at least one first unit (23, 26) connected to the distributed control system via contacts (5', 6', 6"), the at least one first unit, by means of the first protocol, receives and/or sends task instructions concerning the monitoring functions and/or structures; and a second unit (22) connected the first unit and to a tool arrangement interactable with a user and further comprising:

a first computer (21) able to carry out calculation, simulation and/or analysis tasks, or a second computer connected to the first computer that is adapted to configure the second computer, wherein the second computer is adapted to carry out at least some of the tasks of the first computer, wherein the at least one first unit transforms, at least those parts in the first protocol (29) that relate to said tasks into a second protocol (28), by means of which the tasks or parts of tasks can be carried out by the second unit (22), wherein the second unit, by means of the second protocol (28) or a third protocol (27), can communicate with the tool arrangement, which by readings and/or modifications in the first protocol and in the first and second protocols, respectively, can carry out the readings and/or modifications in a same way in the second and third protocols, respectively, wherein the at least one first unit (23, 26) further comprises at least one microprocessor which communicates partly with the distributed control system by means of a connection, a protocol and a bit speed valid for the distributed control system, and communicates with the second unit (22), wherein the second unit is equipped with at least one microprocessor adapted to communicate and exchange information with the at least one first unit and the tool arrangement, and wherein primary readings and/or modifications in the first protocol on the basis of the analysis and/or monitoring can be carried out by means of secondary readings and/or modifications in the second protocol.

2. The arrangement according to claim 1, wherein the second protocol is developed to serve as a common platform for the analysis tasks of two or more systems with different protocols.

3. The arrangement according to claim 1, wherein the second unit provides a common time base for units working in parallel.

4. The arrangement according to claim 1, wherein the at least one first unit is arranged for independent collection, processing and saving of information from the connected distributed control system and in that the information generated in this way is arranged to be able to be read and/or interpreted via information generated by the second unit (22).

5. The arrangement according to claim 1, wherein second parts of task instructions downloaded or transferred from the first computer (21) can be allocated for use in second computer units in different systems.

6. The arrangement according to claim 1, wherein during interaction between the first computer and the user, rules are generated for automatic repetition, and the rules are further modified for a second computer with regard to the collected information and presentation of results of the analysis task.

7. The arrangement according to claim 1, wherein the tool arrangement is adapted with a connection arrangement adapted to communicate with one or more of the microprocessors via serial or wireless communication.

8. The arrangement according to claim 1, wherein the first or second unit is adapted to communicate via a serial communication in one direction and with a microprocessor (4) via a serial communication towards the other direction and to work with a reduced interface toward users.

9. The arrangement according to claim 1, wherein the first or second unit communicates with one or more units via a serial communication by means of the at least one microprocessor and works with a reduced interface toward at least one user, carries out processing of signals from an other unit according to rules attained from the other unit, and comprises a number of units having microprocessors which communicate with serial communication.

10. The arrangement according to claim 9, wherein the units further comprise a local clock which respectively is adjusted or related to a clock in the other unit.

11. The arrangement of claim 7, wherein the communication is by at least one of USB, Bluetooth and Ethernet.

12. The arrangement of claim 8, wherein the serial communication is by at least one of CAN and LIN and the reduced interface is at least one of light diodes and summers.

13. The arrangement of claim 9, wherein the serial communication is by at least one of CAN and LIN and the reduced interface is at least one of light diodes and summers.

* * * * *